(12) United States Patent
Abe et al.

(10) Patent No.: US 9,408,085 B2
(45) Date of Patent: Aug. 2, 2016

(54) BASE STATION APPARATUS, MOBILE STATION APPARATUS AND REFERENCE SIGNAL TRANSMISSION METHOD

(75) Inventors: Tetsushi Abe, Tokyo (JP); Hiroyuki Ishii, Tokyo (JP); Naoto Okubo, Tokyo (JP); Yusuke Ohwatari, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 526 days.

(21) Appl. No.: 13/639,273

(22) PCT Filed: Apr. 5, 2011

(86) PCT No.: PCT/JP2011/058643
§ 371 (c)(1),
(2), (4) Date: Dec. 11, 2012

(87) PCT Pub. No.: WO2011/126025
PCT Pub. Date: Oct. 13, 2011

(65) Prior Publication Data
US 2013/0077518 A1    Mar. 28, 2013

(30) Foreign Application Priority Data

Apr. 5, 2010    (JP) .................................. 2010-087382

(51) Int. Cl.
| H04W 24/02 | (2009.01) |
| H04W 48/08 | (2009.01) |
| H04W 72/04 | (2009.01) |
| H04L 1/00 | (2006.01) |
| H04W 52/40 | (2009.01) |
| H04W 24/10 | (2009.01) |
| H04W 28/18 | (2009.01) |

(Continued)

(52) U.S. Cl.
CPC ............. *H04W 24/02* (2013.01); *H04L 1/0026* (2013.01); *H04W 48/08* (2013.01); *H04W 52/40* (2013.01); *H04W 72/042* (2013.01); *H04W 24/10* (2013.01); *H04W 28/18* (2013.01); *H04W 52/241* (2013.01); *H04W 88/08* (2013.01)

(58) Field of Classification Search
CPC ..... H04W 48/08; H04W 52/40; H04W 24/02; H04W 72/042; H04L 1/0026
USPC .................................................. 370/329, 253
See application file for complete search history.

(56) References Cited

U.S. PATENT DOCUMENTS

| 8,634,363 B2 * | 1/2014 | Kim et al. ...................... 370/329 |
| 2012/0113816 A1 * | 5/2012 | Bhattad et al. ................ 370/246 |

(Continued)

OTHER PUBLICATIONS

3GPP TSG RAN WG1 Meeting #59 R1-094649, Jeju, Korea, Nov. 9-13, 2009.*

(Continued)

*Primary Examiner* — Donald Mills
*Assistant Examiner* — Henry Baron
(74) *Attorney, Agent, or Firm* — Osha Liang LLP

(57) ABSTRACT

The present invention is designed to perform CQI measurement for adjacent cells without making the processes in the user terminal UE complex. A base station apparatus (eNodeB #1) provided in the serving cell has features of acquiring, from a base station apparatus (eNodeB #2) provided in an adjacent cell, the cell ID of the adjacent cell, and the position and transmission power of the CSI-RS, as parameters related to the CSI-RS of the adjacent cell, generating a broadcast signal including the above parameters related to the CSI-RS, and transmitting the generated signal to the user terminal (UE).

8 Claims, 9 Drawing Sheets

(51) Int. Cl.
  *H04W 88/08* (2009.01)
  *H04W 52/24* (2009.01)

(56) References Cited

U.S. PATENT DOCUMENTS

| | | | |
|---|---|---|---|
| 2012/0113961 A1* | 5/2012 | Krishnamurthy | 370/332 |
| 2012/0207126 A1* | 8/2012 | Qu et al. | 370/330 |
| 2012/0287875 A1* | 11/2012 | Kim et al. | 370/329 |
| 2013/0044707 A1* | 2/2013 | Chen | 370/329 |
| 2013/0235812 A1* | 9/2013 | Heo et al. | 370/329 |

OTHER PUBLICATIONS

International Search Report w/translation issued in PCT/JP2011/058643 mailed May 24, 2011 (2 pages).

3GPP TR 25.912 V7.1.0; "3rd Generation Partnership Project; Technical Specification Group Radio Access Network; Feasibility study for evolved Universal Terrestrial Radio Access (UTRA) and Universal Terrestrial Radio Access Network (UTRAN) (Release 7)"; Sep. 2006 (57 pages).

Decision to Grant a Patent issued in Japanese Patent Application No. 2012-509673 with English Translation, mailed Dec. 16, 2015 (4 pages).

* cited by examiner

BASE STATION APPARATUS, MOBILE STATION APPARATUS AND REFERENCE SIGNAL TRANSMISSION METHOD

TECHNICAL FIELD

The present invention relates to a base station apparatus, a mobile station apparatus and a reference signal transmission method. More particularly, the present invention relates to a base station apparatus, a mobile station apparatus and a reference signal transmission method in a next-generation mobile communication system.

BACKGROUND ART

In a UMTS (Universal Mobile Telecommunications System) network, for the purposes of improving spectral efficiency and improving data rates, system features based on W-CDMA (Wideband Code Division Multiple Access) are maximized by adopting HSDPA (High Speed Downlink Packet Access) and HSUPA (High Speed Uplink Packet Access). For this UMTS network, for the purposes of further increasing high-speed data rates, providing low delay and so on, Long Term Evolution (LTE) has been under study (see, for example, Non-Patent Literature 1).

In a third-generation system, it is possible to achieve a transmission rate of maximum approximately 2 Mbps on the downlink by using a fixed band of approximately 5 MHz. Meanwhile, in a system of the LTE scheme, it is possible to achieve a transmission rate of about maximum 300 Mbps on the downlink and about 75 Mbps on the uplink by using a variable band which ranges from 1.4 MHz to 20 MHz. Furthermore, in the UMTS network, for the purpose of achieving further broadbandization and higher speed, successor systems of LTE have been under study (for example, LTE-Advanced (LTE-A)). For example, in LTE-A, there is a plan to expand the maximum system band for LTE specifications, which is 20 MHz, to approximately 100 MHz.

On the downlink in the LTE system (LTE system), the CRS (Common Reference Signal), which is a reference signal that is common between cells, is defined. This CRS is used for demodulation of data channel signals, and, in addition, used for downlink channel quality (CQI: Channel Quality Indicator) measurement for scheduling and adaptive control, and furthermore used for estimation of average downlink channel state (mobility measurement) for cell search and handover.

On the other hand, on the downlink of the LTE-advanced system (LTE-A system), in addition to this CRS, providing the CSI-RS (Channel State Information-Reference Signal) for dedicated use for CQI measurement, is under study. This CSI-RS supports CQI measurement for a plurality of cells by taking into account the transmission and reception of data channel signals by coordinated multiple point (CoMP). The CSI-RS is used for CQI measurement for adjacent cells, and, in this respect, differs from the CRS, which is used in CQI measurement for the serving cell alone.

CITATION LIST

Non-Patent Literature

Non-Patent Literature 1: 3GPP, TR25.912 (V7.1.0), "Feasibility study for Evolved UTRA and UTRAN," September 2006

SUMMARY OF INVENTION

Technical Problem

In the event CQI measurement is performed with respect to a plurality of cells using the CSI-RS, the user terminal UE needs to receive broadcast signals not only from the serving cell but also from adjacent cells, in order to identify parameters such as transmission power. However, to receive broadcast signals from adjacent cells, there are problems that, for example, signal reception from the serving cell has to be interrupted, processes in the user terminal UE become complex, and so on.

The present invention is made in view of the above problems, and it is therefore an object of the present invention to provide a base station apparatus, a mobile station apparatus and a reference signal transmission method that make possible CQI measurement for adjacent cells without making processes in the user terminal UE complex.

Solution to Problem

A base station apparatus according to the present invention has: an acquiring section that acquires, as parameters related to a CSI (Channel State Information)-RS of an adjacent cell, a cell ID of the adjacent cell, and a position and transmission power of the CSI-RS; a generation section that generates a signal including the parameters; and a transmission section that transmits the generated signal on a downlink.

According to this configuration, given that a signal including the cell ID, and the position and transmission power of the CSI-RS of the adjacent cell is transmitted to the user terminal, the user terminal can specify the CSI-RS without receiving a broadcast signal from the adjacent cell, so that it is possible to allow the user terminal to perform CQI measurement for the adjacent cell, without requiring complex processes such as interrupting signal reception from the serving cell.

A mobile station apparatus according to the present invention has: a receiving section that receives a signal including, as parameters related to a CSI-RS of an adjacent cell, a cell ID of the adjacent cell, and a position and transmission power of the CSI-RS, from the serving cell; and a measurement section that specifies the CSI-RS based on the cell ID of the adjacent cell or the position and transmission power of the CSI-RS, included in the received signal, and measures a channel state of the adjacent cell.

According to this configuration, given that a signal including the cell ID, and the position and transmission power of the CSI-RS of the adjacent cell is received from the serving cell, the CSI-RS is specified based on these cell ID, and the position and transmission power of the CSI-RS of the adjacent cell, and the CQI of the adjacent cell is measured, the CSI-RS can be specified without receiving a broadcast signal from the adjacent cell, so that it is possible to measure the CQI of the adjacent cell without requiring complex processes such as interrupting signal reception from the serving cell.

A reference signal transmission method according to the present invention includes the steps of: in a base station apparatus provided in a serving cell, acquiring, as parameters related to a CSI-RS of an adjacent cell, a cell ID of the adjacent cell, and a position and transmission power of the CSI-RS; generating a signal including the parameters; and transmitting the generated signal on a downlink.

According to this method, given that a signal including the cell ID, and the position and transmission power of the CSI-RS of the adjacent cell is transmitted from the serving terminal to the user terminal, the user terminal can specify the CSI-RS without receiving a broadcast signal from the adjacent cell, so that it is possible to allow the user terminal to perform CQI measurement for the adjacent cell without requiring complex processes such as interrupting signal reception from the serving cell.

Advantageous Effects of Invention

According to the present invention, given that a signal including the cell ID, and the position and transmission power of the CSI-RS of an adjacent cell is transmitted from the serving cell to the user terminal, the user terminal can specify the CSI-RS without receiving a broadcast signal from the adjacent cell, so that it is possible to allow the user terminal to perform CQI measurement for the adjacent cell, without requiring complex processes such as interrupting signal reception from the serving cell.

DESCRIPTION OF EMBODIMENTS

First, before explaining the reference signal transmission method according to the present invention, the CRS (Common Reference Signal), which is defined on the downlink of the LTE system, and the CSI-RS (Channel State Information-Reference Signal), which is under study to be defined on the downlink of the LTE-A system, will be described.

Figure 1A:
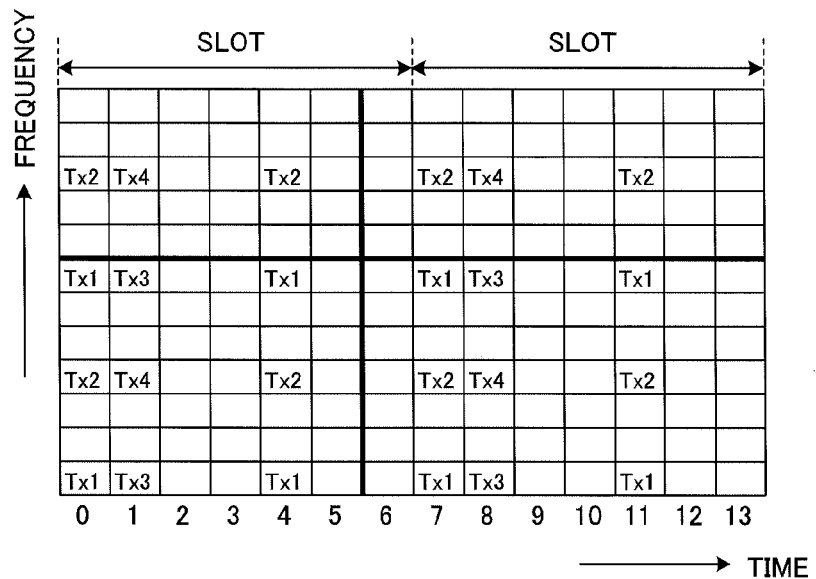
FIG. 1 provides diagrams for explaining the configuration of the CRS defined in the LTE system.
Figure 1B:
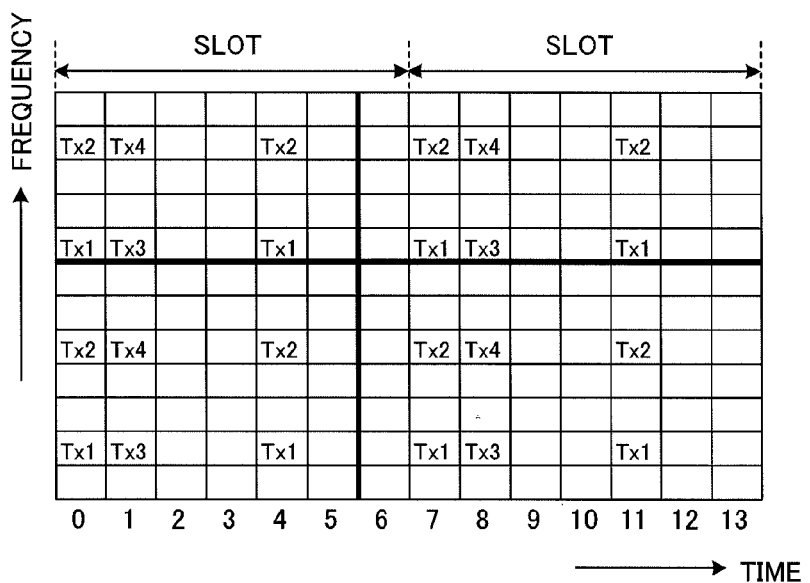

FIG. 1 provides diagrams for explaining the configuration of the CRS. FIG. 1 shows the configuration of the CRS in the case of a base station apparatus eNodeB has four transmission antennas, and FIG. 1A and FIG. 1B show the configuration of the CRS in one resource block (RB) in cell 1 and cell 2 that are adjacent to each other. Note that, in FIG. 1, the vertical axis represents frequency, and the horizontal axis represents time. Note that the CRS is allocated to all resource blocks and all subframes.

The CRS is transmitted to the user terminal UE, as a cell-common reference signal, by transmission power and a phase that are known from the frequency/time known to the user terminal UE. These frequency and transmission power of the CRS are identified by the user terminal UE by the cell ID and broadcast signal, which will be described later. The CRS is generally used to demodulate data channel signals in the user terminal UE, and also used in downlink channel measurement.

The number of symbols and position of the CRS are determined from the aspects of the accuracy of channel estimation and overhead. When the number of transmission antennas is four, as shown in FIG. 1, the CRSs for the first and second transmission antennas are mapped to the first and fifth OFDM symbols in each time slot, every 6 subcarriers, per transmission antenna, the CRSs for the third and fourth transmission antennas are mapped only to the second OFDM symbol in each time slot, to the same subcarriers as for the first and second transmission antennas. Also, as shown in FIGS. 1A and 1B, CRSs are multiplexed by shifting the positions of sub carriers per cell so that the CRSs do not interfere with each other between cells.

The CRS is specified by the parameters of the position, sequence and transmission power. Among these parameters, the position of the CRS is associated with the cell ID. That is to say, the position to which the CRS is shifted in the frequency direction is determined by the cell ID, so that the user terminal UE is able to specify the position of the CRS by identifying the cell ID. Also, the sequence of the CRS is associated with the cell ID. That is to say, the modulation scheme of the CRS to use is determined by the cell ID, so that the user terminal UE is able to specify the sequence of the CRS by identifying the cell ID. Furthermore, the transmission power of the CRS is specified in accordance with the broadcast signal reported in each cell. That is to say, the broadcast signal designates the transmission power of the CRS, so that the user terminal UE is able to specify the transmission power of the CRS by identifying the information in the broadcast signal.

The cell ID, which is referenced to specify the position and sequence of the CRS, is identified when the user terminal UE performs cell search. Consequently, the user terminal UE is able to specify the position and sequence of the CRS by the cell ID acquired by cell search in each cell. That is to say, the user terminal UE is able to specify the parameters of the CRS other than the transmission power, without receiving control signals (broadcast signals).

Figure 2:
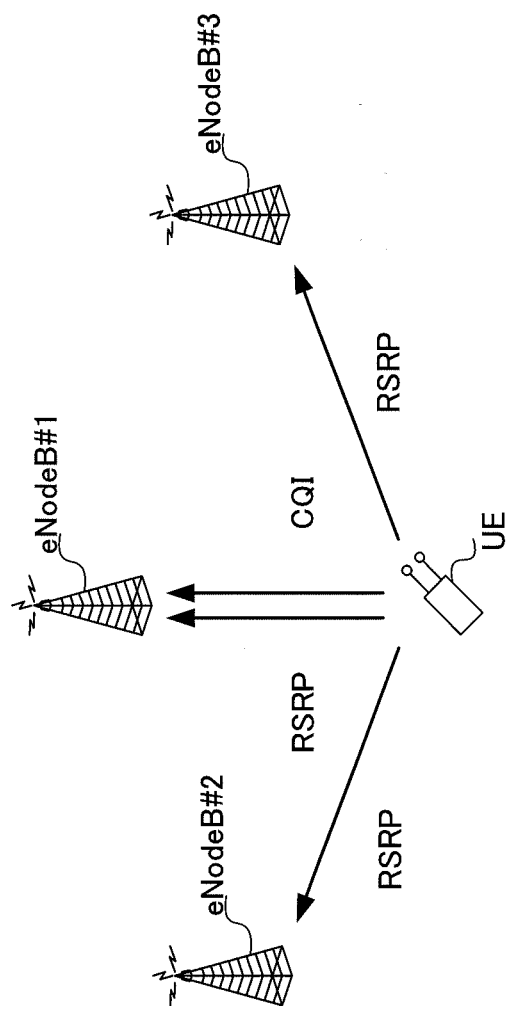
FIG. 2 is a diagram for explaining information that is fed back from the user terminal to the base station apparatuses of the serving cell and adjacent cells in the LTE system.

Now, the content of the channel measurement using the CRS in the user terminal UE will be described with reference to FIG. 2. FIG. 2 is a diagram for explaining information that is fed back from the user terminal UE to the base station apparatuses eNodeB of the serving cell and adjacent cells in the LTE system. The channel measurement using the CRS include estimation of average downlink channel state (mobility measurement) for cell search and handover, and downlink channel quality (CQI: Channel Quality Indicator) measurement for scheduling and adaptive control.

The mobility measurement is performed with respect to the serving cell, to which the user terminal UE is actually connected at present, and adjacent cells, which adjoin this serving cell. In the mobility measurement, when the received power of the CRSs alone is measured, if the positions and sequences of the CRSs of the cells of the measurement target (the serving cell and adjacent cells) are can be specified, it is then possible to carry out the measurement without requiring control signals (broadcast signals). In this mobility measurement, the CRS received signal power (RSRP: Reference Signal Received Power), the CRS received signal quality (RSRQ: Reference Signal Received Quality) and so on are measured. The RSRP and so on measured in the user terminal UE are, as shown in FIG. 2, fed back to base station apparatus eNodeB #1 provided in the serving cell and base station apparatuses eNodeB #2 and #3 provided in adjacent cells. Base station apparatuses eNodeB #1~#3 use the RSRP and so on given by feedback to, for example, make decisions upon handover of the user terminal UE.

CQI measurement is performed only for the serving cell, which is the transmission source of the data channel signals. CQI measurement is possible if the position, sequence and transmission power of the CRS of the cell of the measurement target (serving cell) can be specified. In this CQI measurement, the CQI, RI (Rank Indicator) and PMI (Precoding Matrix Indicator) are determined. The CQI and so on measured in the user terminal UE are, as shown in FIG. 2, fed back to base station apparatus eNodeB #1, provided in the serving cell. Base station apparatus eNodeB #1 uses the CQI and so on given by feedback to, for example, decide the parameters (for example, MCS: Modulation and Coding Scheme) upon transmitting data channel signals to the user terminal UE.

As clear from this, given the CRS of the LTE system, when the user terminal UE performs channel measurement for adjacent cells, specifying their cell IDs alone is sufficient. The cell IDs can be specified by cell search, so that, in channel measurement of adjacent cells, signaling (broadcast signals) is not necessary. That is to say, given the CRS of the LTE system, the signaling that is necessary for the user terminal UE is limited to the transmission power of the CRS in the serving cell.

Figure 3:
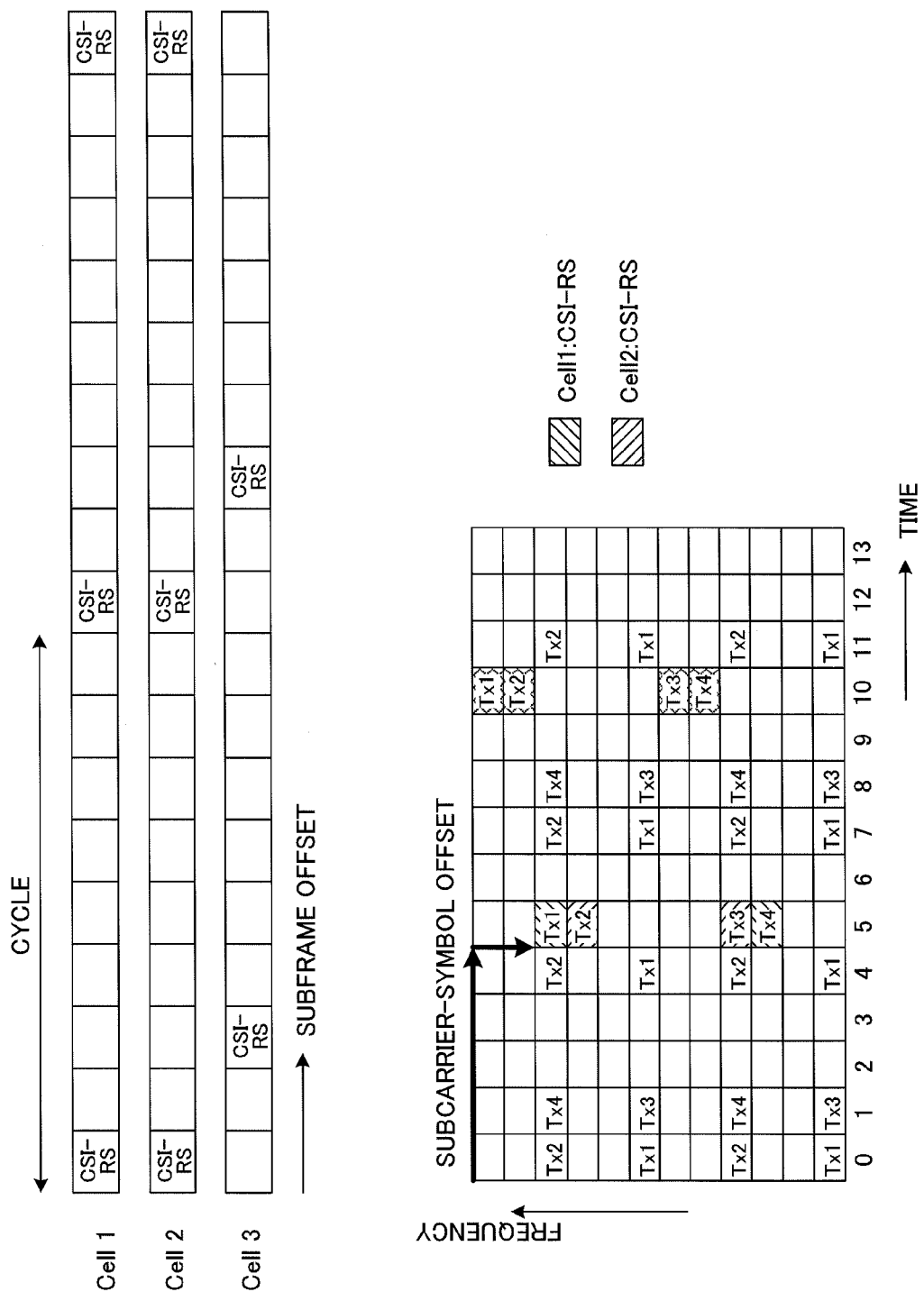
FIG. 3 provides diagrams for explaining the configuration of the CSI-RS.

Next, the configuration of the CSI-RS, which is studied to be defined on the downlink of the LTE-A system, will be described. FIG. 3 is a diagram for explaining the configuration of the CSI-RS. FIG. 3A is a diagram for explaining the configuration of subframes to which the CSI-RS is allocated. FIG. 3B shows the configuration of the CSI-RS in one resource block (RB) in the event a base station apparatus eNodeB has four transmission antennas. Note that FIG. 3B shows the CSI-RSs for adjacent cell 1 and cell 2 in the same resource block for ease of explanation. Also, FIG. 3B shows the CRSs shown in FIG. 1 for ease of explanation.

Unlike the CRS, the CSI-RS is not allocated to all the resource blocks or all the subframes, and, as shown in FIG. 3A, allocated to subframes in a fixed cycle. Also, by subframe offset, the CSI-RS can be allocated a predetermined number of subframes shifted from other cells. FIG. 3A illustrates a case where, in cell 1 and cell 2, the CSI-RSs are allocated in a 10-subframe cycle, and where, in cell 3, the CSI-RSs are allocated at an offset of 2 subframes from the CSI-RSs of cell 1 and cell 2.

Like the CRS, the CSI-RS is specified by the parameters of the position, sequence and transmission power. Among these parameters, the position of the CSI-RS is specified, for example, according to the broadcast signal (SIB2) reported in each cell. That is to say, the broadcast signal designates the amount of subframe offset, the cycle and the amount of sub-carrier-symbol offset of the CSI-RS, so that the user terminal UE is able to specify the position of the CSI-RS by identifying the information in the broadcast signal. Also, the sequence of the CSI-RS is associated with the cell ID. That is to say, the modulation scheme of the CSI-RS to use is determined by the cell ID, so that the user terminal UE is able to specify the sequence of the CSI-RS by identifying the cell ID. Furthermore, the transmission power of the CRS is specified according to the broadcast signal (SIB2) reported in each cell. That is to say, the broadcast signal designates the transmission power of the CSI-RS, so that the user terminal UE is able to specify the transmission power of the CSI-RS by identifying the information in the broadcast signal. Note that the parameters related to the CSI-RS can also be reported using user terminal UE-specific control signals.

FIG. 3B illustrates a case where the CSI-RS corresponding to cell 1 is given a subcarrier-symbol offset and mapped to the sixth OFDM symbol. To be more specific, the CSI-RSs for the first and third transmission antennas are given a subcarrier offset of 2 subcarriers and 5 OFDM symbols, respectively, and allocated to the same subcarriers as for the second transmission antenna of the CRS, and the CSI-RSs for the second and fourth transmission antennas are mapped to subcarriers adjoining the CSI-RSs of the first and third transmission antennas. Also, FIG. 3B illustrates a case where the CSI-RS to correspond to cell 2 is not given a subcarrier-symbol offset and mapped to the eleventh OFDM symbol.

Figure 4:
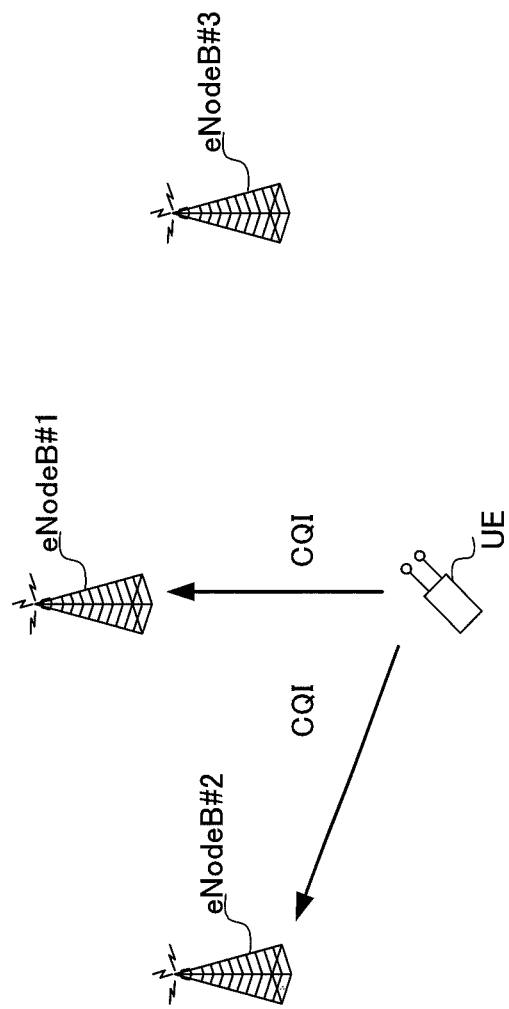
FIG. 4 is a diagram for explaining information that is fed back from the user terminal to the base station apparatuses of the serving cell and adjacent cells in the LTE-A system.

Now, the content of channel measurement using the CSI-RS in the user terminal UE will be described with reference to FIG. 4. FIG. 4 is a diagram for explaining information that is fed back from the user terminal UE to the base station apparatuses eNodeB of the serving cell and adjacent cells in the LTE-A system. Channel measurement using the CSI-RS includes downlink CQI measurement for scheduling and adaptive control. Unlike CQI measurement using the CRS, CQI measurement using the CSI-RS is performed not only for the serving cell but is also performed for adjacent cells. Channel quality is measured in plurality of cells in this way so as to take into account the transmission and reception of data channel signals by coordinated multiple point (CoMP).

As for the CQI measurement in each cell, similar to CQI measurement using the CRS, the CQI is measured, and, based on this measured CQI, the RI and PMI are determined. The CQIs and so on measured in the user terminal UE are, as shown in FIG. 4, fed back to base station apparatus eNodeB #1 provided in the serving cell and to base station apparatus eNodeB #2 provided in an adjacent cell. The base station apparatuses eNodeB #1 and #2 use the CQIs and so on given by fed back, to decide the parameters (for example, MCS) upon transmitting data channel signals to the user terminal UE.

In the event CQI measurement is performed for a plurality of cells including adjacent cells, parameters that are not associated with the cell IDs—that is to say, the positions and transmission power of the CSI-RSs—are reported from the individual cells to the user terminal UE by broadcast signals. Consequently, the user terminal UE has to specify these parameters by receiving the broadcast signals and identifying the information in the broadcast signals. However, when the user terminal UE has to receive broadcast signals for adjacent cells, the user terminal has to, for example, interrupt receiving signals from the serving cell, and the processes in the user terminal UE therefore become complex. The present inventors have focused on the fact that, upon CQI measurement using the CSI-RS, the processes in the user terminal UE become complex due to reception of broadcast signals from a plurality of cells, and have arrived at the present invention.

With the reference signal transmission method according to the first embodiment of the present invention, parameters related to the CSI-RS (hereinafter referred to as "CSI-RS parameters") are communicated between cells, and CSI-RS parameters of adjacent cells are transmitted from the serving cell to the user terminal UE. To be more specific, CSI-RS parameters that are not associated with cell IDs are communicated between cells, and a broadcast signal including these CSI-RS parameters of adjacent cells is generated, and this broadcast signal is transmitted from the serving cell to the user terminal UE. Note that, to transmit the CSI-RS parameters, it is possible to use broadcast signals, or it is equally possible to use user terminal UE-specific signals.

Figure 5:
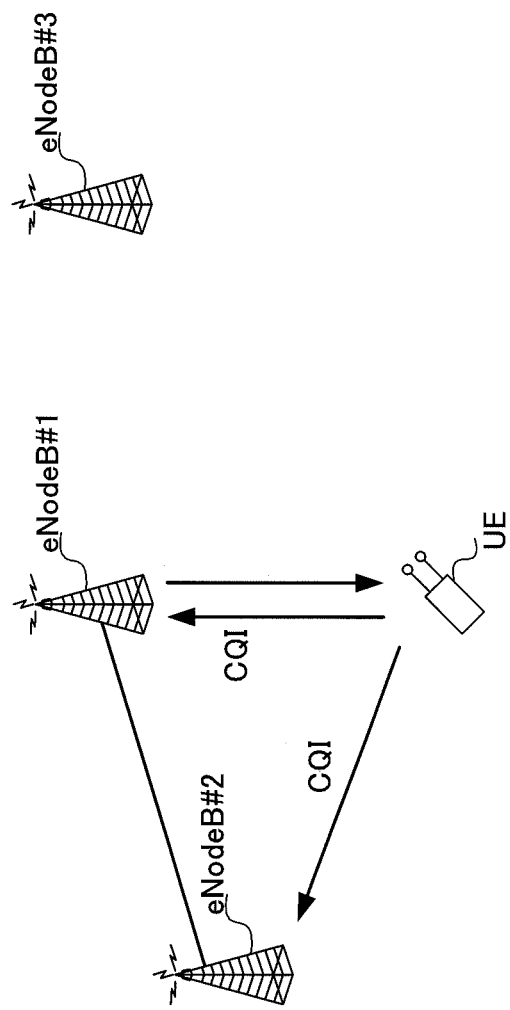
FIG. 5 is a diagram for explaining information that is communicated by the base station apparatus and the user terminal, in a mobile communication system adopting the signal transmission method according to the first embodiment of the present invention.

FIG. 5 is a diagram for explaining information that is communicated between base station apparatuses eNodeB and a user terminal UE, in a mobile communication system adopting the reference signal transmission method according to the first embodiment of the present invention. In the mobile communication system shown in FIG. 5, base station apparatus eNodeB #1 provided in the serving cell is able to transmit and receive the CSI-RS parameters to and from base station apparatuses eNodeB #2 and #3 provided in adjacent cells. The mode of connection between these base station apparatus eNodeB #1 and base station apparatuses eNodeB #2 and #3 is not particularly limited, and may be either wired connection or wireless connection. Note that FIG. 5 illustrates a case where CSI-RS parameters are communicated between base station apparatus eNodeB #1 and base station apparatus eNodeB #2.

In the mobile communication system shown in FIG. 5, CSI-RS parameters not associated with the cell ID of base station apparatus eNodeB #2 are transmitted to base station apparatus eNodeB #1. Base station apparatus eNodeB #1 generates a broadcast signal to include the CSI-RS parameters received from base station apparatus eNodeB #2 and CSI-RS parameters that are not associated with the cell ID of the subject apparatus, and transmits the broadcast signal to the user terminal UE. This broadcast signal includes the position (the amount of subframe offset, the amount of subcarrier-symbol offset and the cycle) and transmission power of the CSI-RS, as CSI-RS parameters of the serving cell. Also, this broadcast signal includes the cell ID (adjacent cell ID) for identifying the adjacent cell, and the position (the amount of subframe offset, the amount of subcarrier-symbol offset and the cycle) and transmission power of the CSI-RS, as CSI parameters for the adjacent cell.

The user terminal UE is able to specify the sequence of the CSI-RS of the adjacent cell from the cell ID designated by the broadcast signal from the serving cell, and also specify the position (the amount of subframe offset, the amount of subcarrier-symbol offset and the cycle) and transmission power of the CSI-RS of the adjacent cell designated by this broadcast signal, so that it is possible to specify the CSI-RS from these. By this means, the user terminal UE is able to perform CQI measurement without receiving a broadcast signal from the adjacent cell. The CQI and so on measured in the user terminal UE are, as shown in FIG. 5, fed back to base station apparatus eNodeB #2 specified by the adjacent cell ID.

Note that the CSI-RS of the serving cell can be specified from the sequence of the CSI-RS associated with the cell ID acquired by cell search, and the position (the amount of subframe offset, the amount of subcarrier-symbol offset and the cycle) and transmission power of the CSI-RS designated by the broadcast signal. The CQI and so on measured in the user terminal UE are, as shown in FIG. 5, fed back to base station apparatus eNodeB #1.

In this way, given that the reference signal transmission method according to the first embodiment of the present invention is designed to transmit a broadcast signal including the CSI-RS parameters of an adjacent cell from the serving cell to the user terminal UE, it is possible to specify the sequence of the CSI-RS from the cell ID designated by this broadcast signal and also specify the position (the amount of subframe offset, the amount of subcarrier-symbol offset and the cycle) and transmission power of the CSI-RS of the adjacent cell designated by this broadcast signal, so that it is possible to specify the CSI-RS from these, and, in the user terminal UE, perform CQI measurement without receiving broadcast signals from adjacent cells. As a result of this, it becomes possible to perform CQI measurement for adjacent cells without making the processes in the user terminal UE complex.

Figure 6A:
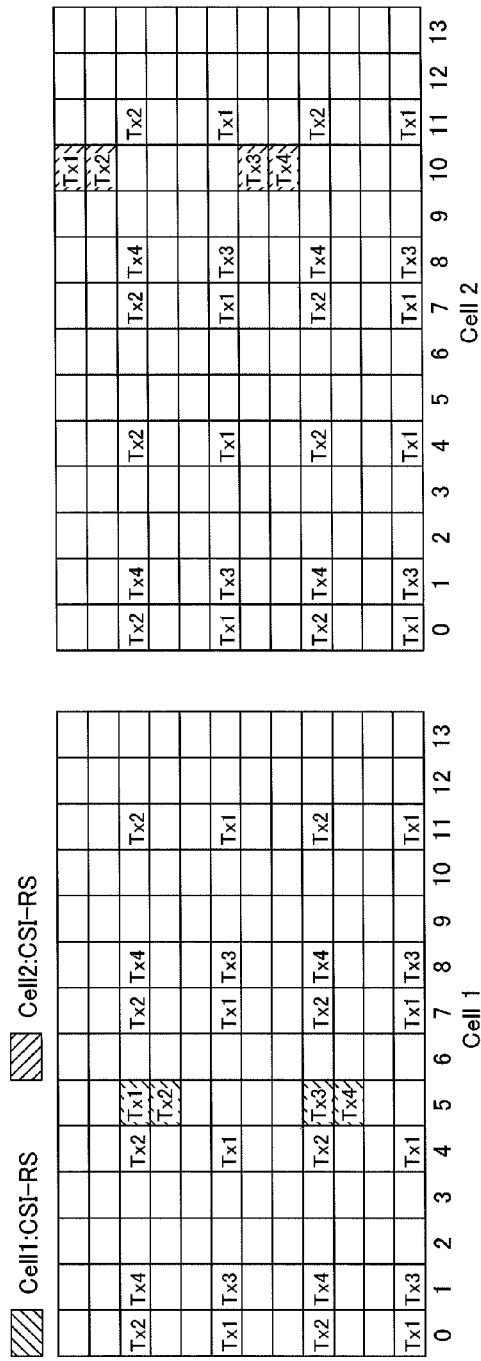
FIG. 6 provides diagrams for explaining muting in channel quality measurement using the CSI-RS.
Figure 6B:
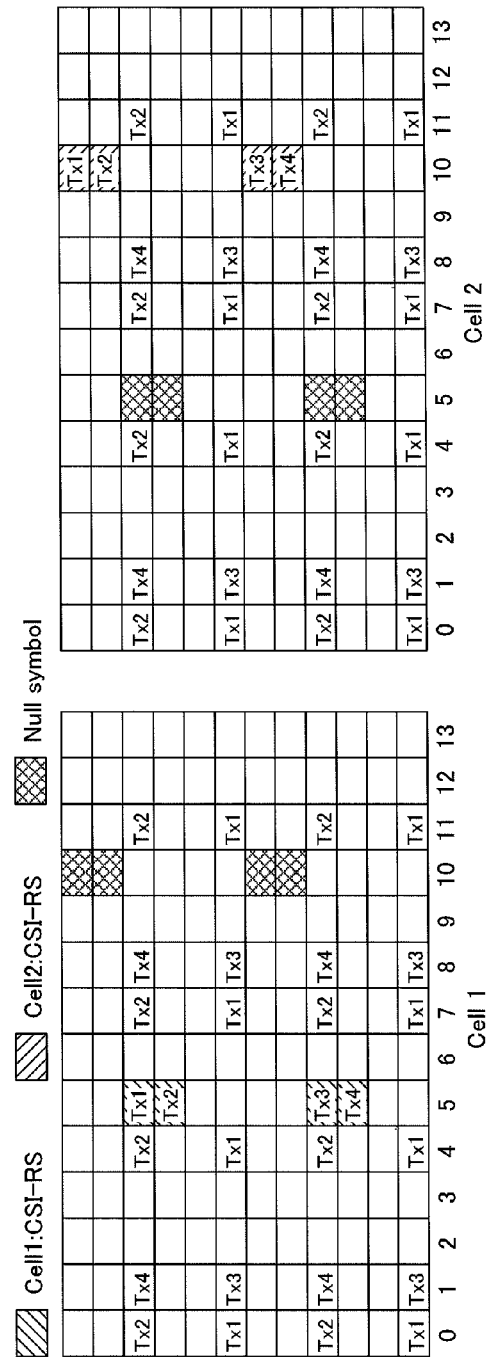

Now, in CQI measurement the using CSI-RS, for the purpose of improving the accuracy of CQI measurement for adjacent cells, muting, which does not allocate data channel signals to resource elements to correspond to the resource elements (REs) (hereinafter referred to as "CSI-RS resource elements") to which the CSI-RSs of adjacent cells are mapped, and which makes these resource elements null, is under study. Now, muting in CQI measurement using the CSI-RS will be described below with reference to FIG. 6. FIG. 6 provides diagrams for explaining muting in channel quality measurement using the CSI-RS. FIG. 6A shows the configuration of the CSI-RSs for adjacent cells 1 and 2 in a state muting is not performed, and FIG. 6B shows the configuration of the CSI-RSs for adjacent cells 1 and 2 in a state muting is performed. Note that FIG. 6 illustrates a case where the CSI-RSs are mapped in the same way as in FIG. 3B.

As shown in FIG. 6A, in a state muting is not performed, the data channel signal is allocated to the resource elements for cell 1 corresponding to the CSI-RS resource elements for cell 2. Likewise, the data channel signal is allocated to the resource elements for cell 2 corresponding to the CSI-RS resource elements for cell 1. These data channel signals constitute interference components against the CSI-RSs, and become a factor to damage the accuracy of channel quality estimation in the user terminal UE.

To prevent deterioration of the accuracy of channel quality estimation due to such allocation of data channel signals, muting does not allocate data channel signals to resource elements corresponding to the CSI-RS resource elements of the adjacent cell, and makes these resource elements null. As shown in FIG. 6B, in a state muting is performed, data channel signals are not allocated to the resource elements for cell 1 corresponding to the CSI-RS resource elements for cell 2, and these resource elements are made null. Likewise, data channel signals are not allocated to the resource elements for cell 2 corresponding to the CSI-RS resource elements for cell 1. In this way, by making resource elements to correspond to the CSI-RS resource elements for the adjacent cell null, it is possible to exclude data channel signal for the adjacent cell from the interference components of the CSI-RSs and consequently improve the accuracy of channel quality estimation in the user terminal UE.

However, when muting is performed in this way, interference from the adjacent cell is completely cancelled, and therefore, in CQI measurement in the user terminal UE, the CQI may be estimated greater than the actual CQI. To cope with this situation, with the reference signal transmission method according to a second embodiment of the present invention, on/off or the cycle of muting is included in the CSI-RS parameters to be reported to the user terminal UE by broadcast signals. In the event on/off of muting and so on are included in this way, the user terminal UE is able to identify whether or not muting is in use, and therefore is able to estimate a CQI to match the actual CQI, by estimating the CQI taking into account the interference components of resource elements that are muted.

As described earlier, the user terminal UE is able to specify the positions and transmission power of the CSI-RSs for cells 1 and 2 from the CSI-RS parameters designated in broadcast signals, and therefore is able to specify the signal power of resource elements for other cells that are made null by muting. Consequently, upon CQI measurement, by using the transmission power of these resource elements in the calculation of the CQI, it is possible to estimate a CQI to match the actual CQI.

In this case, the user terminal UE is able to calculate $CQI_{cell1}$ in cell 1 according to equation 1. Now, $S_{cell1}$ represents the transmission power of the CSI-RS for cell 1, and $S_{cell2}$ represents the signal power of the resource elements for cell 2 that are made null by muting. Also, "N" represents noise. That is to say, the user terminal UE places the signal power of the resource elements for cell 2 that are made null by muting, in the denominator of the algorithm of $CQI_{cell1}$. By this means, it is possible to estimate $CQI_{cell1}$ that matches the actual CQI. Likewise, the user terminal UE calculates $CQI_{cell2}$ in cell 2 according to equation 2. That is to say, the user terminal UE places the signal power of the resource elements for cell 1 that are made null by muting, in the denominator of the algorithm of $CQI_{cell2}$. By this means, it is possible to estimate $CQI_{cell2}$ that matches the actual CQI.

$$CQI_{cell1} = \frac{S_{cell1}}{S_{cell2} + N} \quad \text{(Equation 1)}$$

$$CQI_{cell2} = \frac{S_{cell2}}{S_{cell1} + N} \quad \text{(Equation 2)}$$

By contrast with this, in the event the resource elements for cell 2 corresponding to the CSI-RS resource elements for cell 1 are made null by muting, $CQI_{cell1}$ is calculated by equation 3. That is to say, since the applicable resource elements are made null, only noise N remains in the denominator of the algorithm of the CQI, and, as a result, $CQI_{cell1}$ is over-estimated. Likewise, in the event the resource elements for cell 1 corresponding to the CSI-RS resource elements for cell 2 are made null by muting, $CQI_{cell2}$ is calculated by equation 4, and therefore $CQI_{cell2}$ is over-estimated.

$$CQI_{cell1} = \frac{S_{cell1}}{0 + N} \quad \text{(Equation 3)}$$

$$CQI_{cell2} = \frac{S_{cell2}}{0 + N} \quad \text{(Equation 4)}$$

In this way, with the reference signal transmission method according to the second embodiment of the present invention, on/off or the cycle of muting is reported by the CSI-RS parameters included in broadcast signals, so that the user terminal UE is able to identify whether or not muting is in use. By this means, the user terminal UE is able to estimate a CQI to match the actual CQI by estimating the CQI taking into account interference components of resource elements that are muted.

Note that on/off or the cycle of muting can be learned only in the serving cell and therefore can be included in the CSI-RS parameters for the serving cell. Also, depending on communication of information related to muting with adjacent cells, it is equally possible to include on/off or the cycle of muting in the CSI-RS parameters for the adjacent cells.

In the above-described muting, the transmission power of the resource elements that are made null is made 0, so that, in an OFDM symbol including these resource elements, not all power that is allocated to that OFDM symbol is used. To cope with this situation, with the reference signal transmission method according to a third embodiment of the present invention, in the event the CSI-RSs of adjacent cells are multiplexed over the same OFDM symbol, the power of the resource elements to be made null is redistributed to the CSI-RS resource elements and amplified, and also the amount of offset of power (the amount of power offset) is included in the CSI-RS parameters to be reported to the user terminal UE in the broadcast signals. In this way, in the event the amount of power offset is included, the user terminal UE can perform CQI measurement using a CSI-RS with amplified power, so that it is possible to improve the accuracy of CQI estimation.

Figure 7:
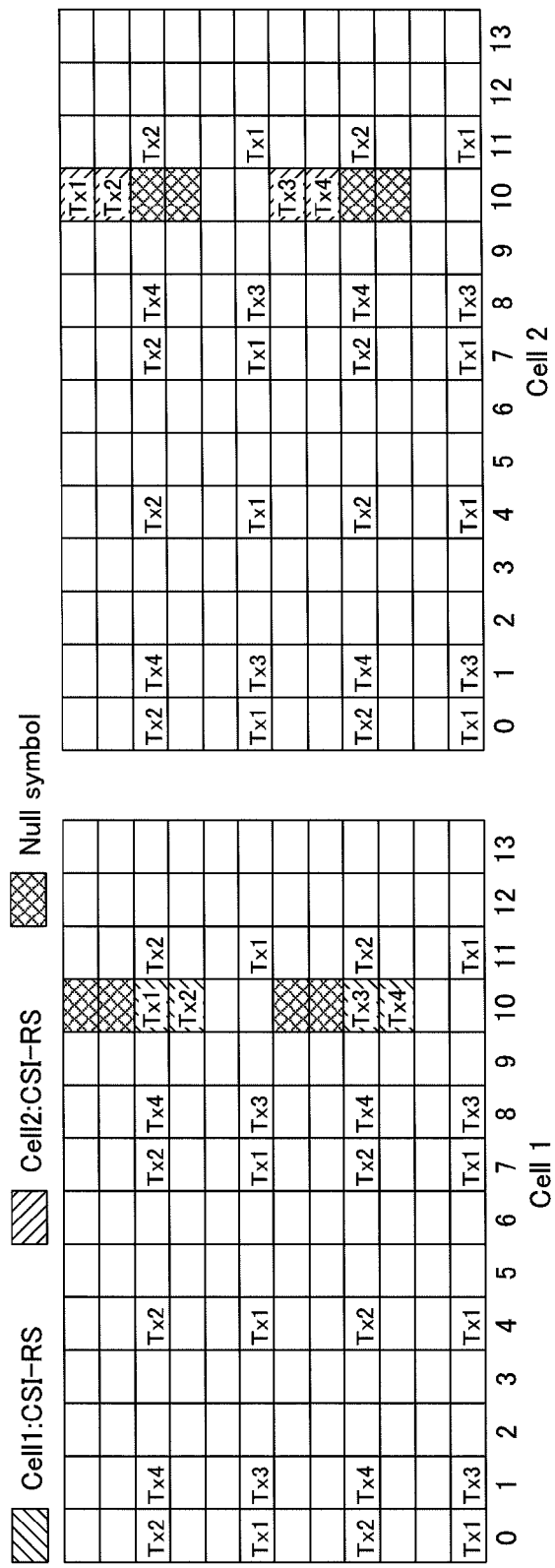
FIG. 7 is a diagram showing a configuration of the CSI-RS adopting the reference signal transmission method according to the third embodiment of the present invention.

FIG. 7 is a diagram showing a configuration of the CSI-RS adopting the reference signal transmission method according to the third embodiment of the present invention. FIG. 7 illustrates a case where the CSI-RSs of adjacent cells 1 and 2 are mapped to the same OFDM symbol. Also, FIG. 7 illustrates a case where the resource elements for cell 1 corresponding to the CSI-RS resource elements for cell 2 are made null, and where the resource elements for cell 2 corresponding to the CSI-RS resource elements for cell 1 are made null by muting.

With the reference signal transmission method according to the third embodiment of the present invention, the transmission power of the resource elements that are made null in cell 1 is redistributed to the CSI-RS resource elements to amplify, and also the amount of power offset is included in the CSI-RS parameters to be reported to the user terminal UE in the broadcast signal. Upon receiving this broadcast signal, the user terminal UE recognizes the amplification of the CSI-RS and performs CQI measurement using the CSI-RS with amplified power, so that it is possible to improve the accuracy of CQI estimation. Likewise, the transmission power of the resource elements that are made null in cell 2 is redistributed to the CSI-RS resource elements to amplify, and also is included in the CSI-RS parameters to be reported to the user terminal UE in the broadcast signal, so that the user terminal UE is able to recognize the amplification of the CSI-RS and perform CQI measurement using the CSI-RS with amplified transmission power, so that it is possible to improve the accuracy of CQI estimation.

In this way, with the reference signal transmission method according to the third embodiment of the present invention, in the event the CSI-RSs of adjacent cells are multiplexed over the same OFDM symbol, the transmission power of the resource elements to be made null is redistributed to the CSI-RS resource elements to amplify, and also the amount of power offset which has been amplified for the transmission power of the resource elements to be made null is reported to the user terminal UE in the broadcast signals, so that the user terminal UE can perform CQI measurement using a CSI-RS with amplified power, and consequently it is possible to improve the accuracy of CQI estimation.

Note that the amount of power offset can be learned only in the serving cell and therefore can be included in the CSI-RS parameters for the serving cell. Also, depending on communication of information related to muting with adjacent cell, the amount of power offset might as well be included in the CSI-RS parameters for adjacent cells.

Note that, in the above descriptions, cases have been described where the amount of subframe offset and the amount of subcarrier-symbol offset of the CSI-RS are designated in the broadcast signal reported in each cell. However, regarding the amount of subframe offset and the amount of subcarrier-symbol offset of the CSI-RS are not limited to cases of being designated by the broadcast signal and can also be associated with the cell ID as well. In this case, the user terminal UE is able to specify part of information that is related to the position of the CSI-RS by identifying the cell ID. In this way, when the amount of subframe offset and the amount of subcarrier-symbol offset of the CSI-RS are associated with the cell ID, it is possible to reduce the amount of information to be reported in the broadcast signal.

Figure 8:
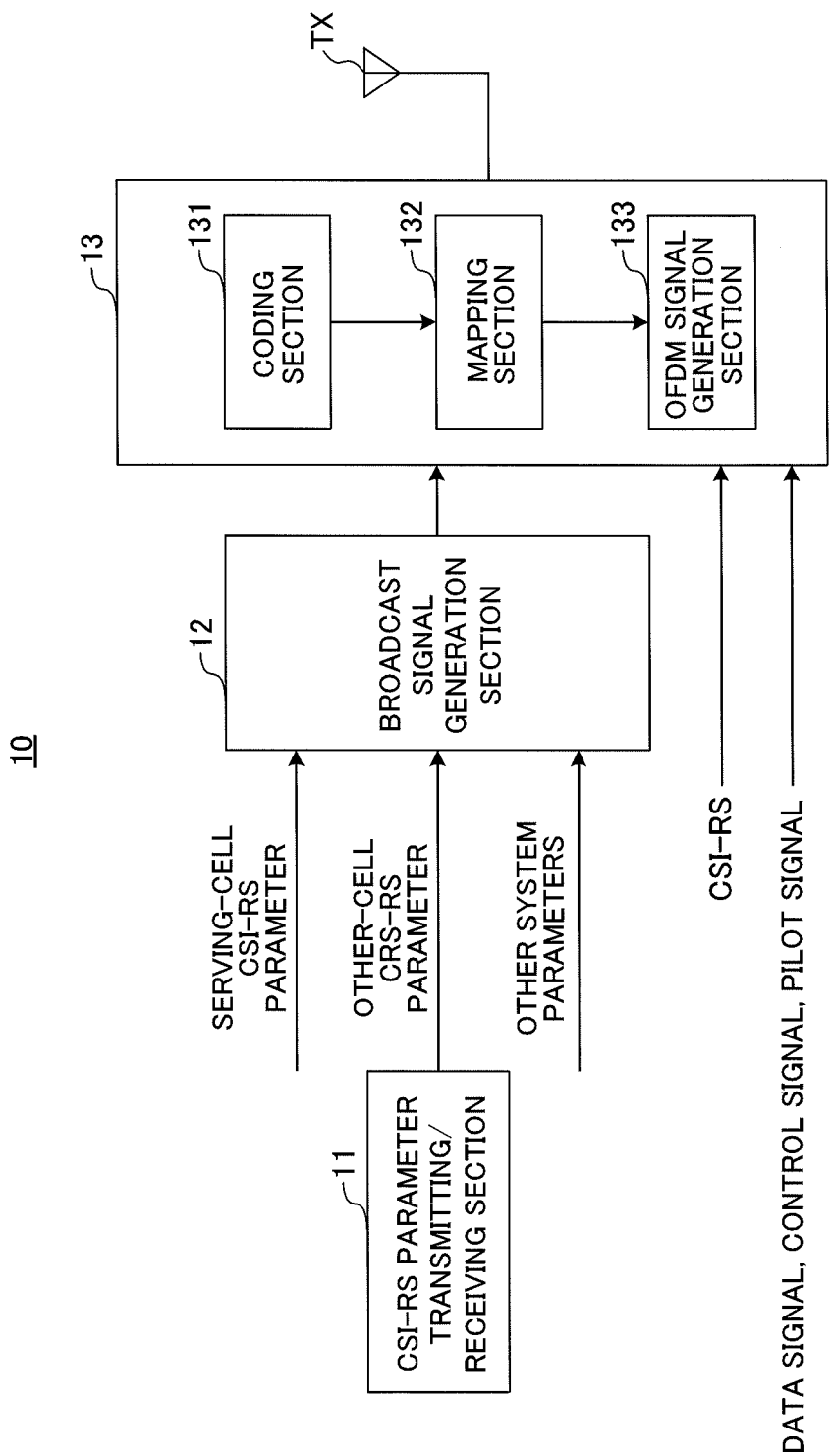
FIG. 8 is a block diagram showing a configuration of a base station apparatus adopting the reference signal transmission method according to the present invention.
Figure 9:
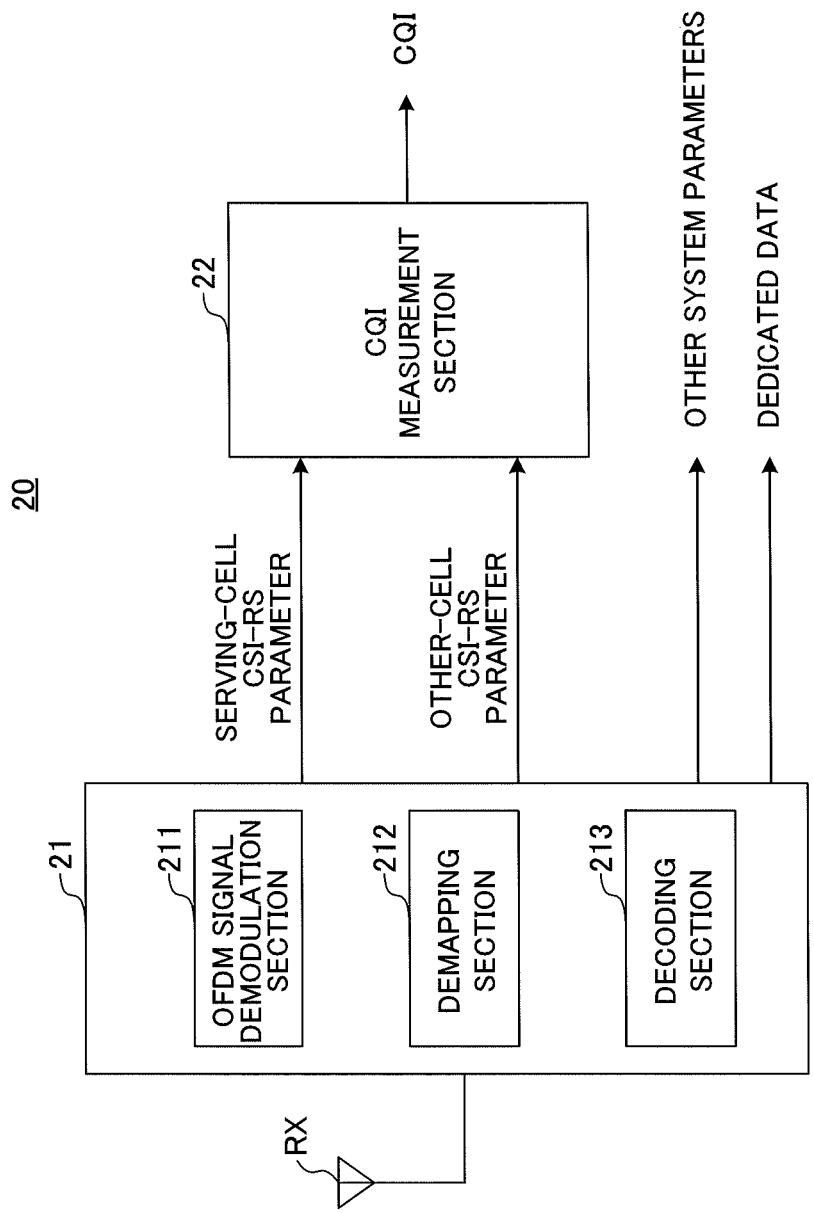
FIG. 9 is a block diagram showing a configuration of a mobile station apparatus that receives the CSI-RS transmitted by the reference signal transmission method according to the present invention.

Now, the configurations of a base station apparatus (eNodeB) 10 which adopts the reference signal transmission method according to the present invention, and a mobile station apparatus (UE) 20 which communicates with this base station apparatus 10, will be described with reference to FIG. 8 and FIG. 9. FIG. 8 is a block diagram showing a configuration of the base station apparatus 10 that adopts the reference signal transmission method according to the present invention. FIG. 9 is a block diagram showing a configuration of mobile station apparatus 20 to receive CSI-RSs transmitted by the reference signal transmission method according to the present invention. Note that the configurations of the base station apparatus 10 shown in FIG. 8 and the mobile station apparatus 20 shown in FIG. 9 are simplified to describe the present invention and have the configurations which a normal base station apparatus and mobile station apparatus have.

As shown in FIG. 8, the base station apparatus 10 is configured to include: a CSI-RS parameter transmitting/receiving section 11 that transmits and receives CSI-RS parameters to and from other base station apparatuses provided in adjacent cells; a broadcast signal generation section 12 that generates a broadcast signal including the CSI-RS parameters of adjacent cells received in the CSI-RS parameter transmitting/receiving section 11; and a baseband signal processing section 13 that performs channel coding of the broadcast signal generated in broadcast signal generation section 12 and data channel signal, maps OFDM symbols to subframes, and generates OFDM signals.

The CSI-RS parameter transmitting/receiving section 11, which constitutes an acquiring section, acquires the CSI-RS parameters that are not associated with the cell ID from the base station apparatuses provided in adjacent cells, and outputs these CSI-RS parameters to the broadcast signal generation section 12. Also, the CSI-RS parameter transmitting/receiving section 11 outputs the CSI-RS parameters not associated with the cell ID, in the cell (serving cell) where the subject apparatus is provided, and other system parameters, to the broadcast signal generation section 12. Note that these other system parameters include, for example, the uplink bandwidth. For example, as the CSI-RS parameters of adjacent cells, the CSI-RS parameter transmitting/receiving section 11 receives, for example, the adjacent cell IDs, the positions (the amount of subframe offset, the amount of subcarrier-symbol offset and the cycle) and transmission power of the CSI-RSs of the adjacent cells.

The broadcast signal generation section 12, which constitutes a generation section, generates broadcast signals based on the CSI-RS parameters of the adjacent cells, the CSI-RS parameters of the serving cell and other system parameters. For example, the broadcast signal generation section 12 generates a broadcast signal including the positions (the amount of subframe offset, the amount of subcarrier-symbol offset and the cycle) and transmission power of the CSI-RSs in the adjacent cells (the reference signal transmission method according to the first embodiment). Also, in addition to the above-described CSI-RS parameters, a broadcast signal to include on/off or the cycle of muting is generated (the reference signal transmission method according to the second embodiment). Furthermore, in addition to the above-described CSI-RS parameters, a broadcast signal to include the amount of power offset for the CSI-RS amplified by the transmission power of the resource elements that are made null by muting is generated (the reference signal transmission method according to the third embodiment). Note that the broadcast signals to include on/off of muting and so on or power offset are generated, for example, according to commands from upper layers.

The broadcast signals generated by the broadcast signal generation section 12 are input in the baseband signal processing section 13. Also, the baseband signal processing section 13 receives as input the CSI-RSs generated by a reference signal generation section (not illustrated), and data channel signals (data signals), control channel signals (control signals) and pilot signals that are commanded from upper station apparatuses.

In the baseband signal processing section 13, various signals including the broadcast signal are subject to channel coding by the channel coding section 131, mapped to OFDM symbols and subframes by the mapping section 132, and, after that, modulated into OFDM signals by the OFDM signal generation section 133. The above-described muting is realized by making the applicable resource elements null by the mapping section 132. Also, the above-described power offset is realized by controlling the transmission power of the applicable resource elements.

The baseband signal generated by the baseband signal processing section 13 is subjected to a frequency conversion process to be converted into a radio frequency band in a transmitting/receiving section (not illustrated), and transmitted to the mobile station apparatus 20 on the downlink via a transmission antenna TX. Note that the baseband signal processing section 13, the transmitting/receiving section and the transmission antenna TX constitute a transmission means.

In this way, the base station apparatus 10 according to the present embodiment acquires the adjacent cell IDs, the positions (the amount of subframe offset, the amount of subcarrier-symbol offset and the cycle) and transmission power of the CSI-RSs of adjacent cells as CSI-RS parameters for the adjacent cells, generates a broadcast signal to include these CSI-RS parameters, and transmits the broadcast signal to the mobile station apparatus 20, so that the CSI-RSs of the adjacent cells can be specified without making the mobile station apparatus 20 perform a process of receiving the broadcast signals of the adjacent cells, and, consequently, it is possible to allow the mobile station apparatus 20 to perform CQI measurement for the adjacent cells without requiring complex processes such as interrupting receiving signals from the serving cell.

Also, the base station apparatus 10 according to the present embodiment generates a broadcast signal including on/off or the cycle of muting and transmits this broadcast signal to the mobile station apparatus 20, so that it is possible to allow the mobile station apparatus 20 to identify whether or not muting is in use and estimate channel quality by taking into account the interference components of resource elements that are muted.

Furthermore, when the CSI-RSs for adjacent cells are multiplexed over the same OFDM symbol, the base station apparatus 10 according to the present embodiment redistributes the power of the resource elements to be made null by muting to the CSI-RSs and amplifies the CSI-RSs, and also reports the amount of power offset for the CSI-RSs amplified by the transmission power of the resource elements to be made null by muting, to the mobile station apparatus 20 by a broadcast signal, so that it is possible to allow the mobile station apparatus 20 to perform CQI measurement using the CSI-RSs with amplified transmission power.

Meanwhile, as shown in FIG. 9, the mobile station apparatus 20 is configured to include an OFDM signal processing section 21 that performs the demodulation process, demapping and decoding process of an OFDM signal received via a receiving antenna RX, and a CQI measurement section 22 that measures channel quality (CQI) based on the CSI-RS parameters of the serving cell and adjacent cells received in the OFDM signal processing section 21.

In the OFDM signal processing section 21, the OFDM signal received via the receiving antenna RX is demodulated in the OFDM signal demodulation section 211 and demapped in the demapping section 212, and, after that, decoded in the decoding section 213. Then, in the received data decoded in the decoding section 213, the CSI-RS parameters for the serving cell and adjacent cells are output to the CQI measurement section 22, and other system parameters and dedicated data channel signals (dedicated data) are output to the upper layers. Note that these receiving antenna RX and OFDM signal processing section 21 constitute a receiving means.

The CQI measurement section 22, which constitutes a measurement section, specifies the CSI-RSs of the serving cell and adjacent cells based on the CSI-RS parameters of the serving cell and adjacent cells, and performs CQI measurement. In this case, the CQI measurement section 22 can specify the sequence of the CSI-RS from the cell ID designated by the broadcast signal from the serving cell, and also specify the positions (the amount of subframe offset, the amount of subcarrier-symbol offset and the cycle) and transmission power of the CSI-RSs of the adjacent cells designated by this broadcast signal, and therefore specify the CSI-RS from these (the reference signal transmission method according to the first embodiment). Also, upon performing CQI measurement, when there is report to the effect that muting is in use by on/off or the cycle of muting included in the CSI-RS parameters, $CQI_{cell1}$ and $CQI_{cell2}$ are calculated according to equation 1 and equation 2 described above (the reference signal transmission method according to the second embodiment). In addition to this, in the event the amount of power offset is included in the CSI-RS parameters, the CQI measurement is performed based on a CSI-RS of transmission power amplified by that amount of power offset.

In this way, given that the mobile station apparatus 20 according to the present embodiment receives a broadcast signal including the CSI-RS parameters of adjacent cells from the base station apparatus 10 provided in the serving cell, it is possible to specify the sequence of the CSI-RS from the cell ID designated by this broadcast signal and also specify the positions (the amount of subframe offset, the amount of subcarrier-symbol offset and the cycle) and transmission power of the CSI-RSs of the adjacent cells designated by this broadcast signal, and consequently identify the CSI-RS without receiving broadcast signals from the adjacent cells, so that it is possible measure the CQI of the adjacent cells without requiring complex processes such as interrupting receiving signals from the serving cell.

Also, given that the mobile station apparatus 20 according to the present embodiment, upon receiving a broadcast signal including on/off or the cycle of muting, estimates the interference components of the resource elements to be made null by muting and measures the CQI of the serving cell and adjacent cells, it is possible to avoid the situation where the interference components of the adjacent cells are excluded by muting, so that it is possible to estimate CQIs to match the actual channel quality.

Furthermore, given that the mobile station apparatus 20 according to the present embodiment, upon receiving a broadcast signal including the amount of power offset for a CSI-RS that is amplified by the transmission power of resource elements that are made null by muting, measures the CQIs of the serving cell and adjacent cells based on the CSI-RS of transmission power reflecting that amount of power offset, it is possible to carry out the CQI measurement using the CSI-RS with amplified transmission power, so that it is possible to improve the accuracy of CQI estimation.

As described above, with the reference signal transmission method according to the present embodiment, a broadcast signal including the CSI-RS parameters of adjacent cells is generated in the base station apparatus 10 provided in adjacent cells and transmitted to the mobile station apparatus 20, so that it is possible to specify the sequence of the CSI-RS from the cell ID designated in this broadcast signal and also specify the positions (the amount of subframe offset, the amount of subcarrier-symbol offset and the cycle) and transmission power of the CSI-RSs of the adjacent cells designated in this broadcast signal, and specify the CSI-RSs of the adjacent cells without receiving broadcast signals from the adjacent cells, and, consequently, it is possible to perform CQI measurement for the adjacent cells in the mobile station apparatus 20 without requiring complex processes such as interrupting receiving signals from the serving cell.

Although cases have been shown in the above descriptions where broadcast signals to include the CSI-RS parameters for adjacent cells are generated in the base station apparatus 10 provided in the serving cell and transmitted to the mobile station apparatus 20. However, signals to include CSI-RS parameter are by no means limited to broadcast signals. For example, it is equally possible to generate control signals to include the CSI-RS parameters of adjacent cells in the base station apparatus 10 provided in the serving cell and transmit these control signals to the mobile station apparatus 20.

Now, although the present invention has been described in detail with reference to the above embodiments, it should be obvious to a person skilled in the art that the present invention is by no means limited to the embodiments described in this specification. The present invention can be implemented with various corrections and in various modifications, without departing from the spirit and scope of the present invention defined by the recitations of the claims. Consequently, the descriptions in this specification are provided only for the purpose of explaining examples, and should by no means be construed to limit the present invention in any way.

The disclosure of Japanese Patent Application No. 2010-087382, filed on Apr. 5, 2010, including the specification, drawings, and abstract, is incorporated herein by reference in its entirety.

The invention claimed is:

1. A base station apparatus of a serving cell comprising:
   a generation section configured to generate signals to specifically notify a mobile station apparatus of CSI-RS (Channel State Information-Reference Signal) parameters of the serving cell, including a signal sequence, a location position in a resource block and transmission power of the serving cell, and CSI-RS parameters of an adjacent cell, including a signal sequence, a location position in a resource block and transmission power of the adjacent cell; and
   a transmission section configured to transmit generated signals including the CSI-RS parameters of the serving cell and the CSI-RS parameters of the adjacent cell specifically to the mobile station apparatus via the serving cell on a downlink.

2. The base station apparatus as defined in claim 1, wherein the generation section generates a signal including on/off information of muting which indicates whether a resource element in the resource block is made null or not.

3. A mobile station apparatus comprising:
   a receiving section configured to receive, from a serving cell, signals to notify the mobile station apparatus of CSI-RS (Channel State Information-Reference Signal) parameters of the serving cell, including a signal sequence, a location position in a resource block and transmission power of the serving cell, and CSI-RS parameters of an adjacent cell, including a signal sequence, a location position in a resource block and transmission power of the adjacent cell;

a demodulating section configured to demodulate the signals received from the serving cell to acquire the CSI-RS parameters of the serving cell and the CSI-RS parameters of the adjacent cell, individually; and a measurement section configured to specify a CSI-RS of the adjacent cell based on the CSI-RS parameters of the adjacent cell notified from the serving cell and perform CQI (Channel Quality Indicator) measurement by using the specified CSI-RS of the adjacent cell, and to specify a CSI-RS of the serving cell based on the CSI-RS parameters of the serving cell notified from the serving cell and perform CQI measurement by using the specified CSI-RS of the serving cell.

4. The mobile station apparatus as defined in claim 3, wherein the receiving section receives a signal including on/off information of muting which indicates whether a resource element in the resource block is made null or not.

5. The mobile station apparatus as defined in claim 3, wherein:
the receiving section receives a signal including, as the CSI-RS parameters, an amount of transmission power offset for a CSI-RS that is amplified by transmission power of a resource element that is made null by muting; and the measurement section measures CQIs of the serving cell and adjacent cell based on the CSI-RS having transmission power reflecting the amount of transmission power offset.

6. A communication system comprising: a base station apparatus of a serving cell; and a mobile station apparatus communicating with the base station apparatus,
the base station apparatus of the serving cell comprising:
a generation section configured to generate signals to specifically notify the mobile station apparatus of CSI-RS (Channel State Information-Reference Signal) parameters of the serving cell, including a signal sequence, a location position in a resource block and transmission power of the serving cell, and CSI-RS parameters of an adjacent cell, including a signal sequence, a location position in a resource block and transmission power of the adjacent cell; and
a transmission section configured to transmit generated signals including parameters of the serving cell and the CSI-RS parameters of the adjacent cell specifically to the mobile station apparatus via the serving cell on a downlink, and
the mobile station apparatus comprising:
a receiving section configured to receive, from the serving cell, the signals to specifically notify the mobile station apparatus of the CSI-RS parameters of the serving cell, including the signal sequence, the location position in a resource block and the transmission power of the serving cell, and the CSI-RS parameters of the adjacent cell, including the signal sequence, the location position in a resource block and the transmission power of the adjacent cell;
a demodulating section configured to demodulate the signals received from the serving cell to acquire the CSI-RS parameters of the serving cell and the CSI-RS parameters of the adjacent cell, individually; and
a measurement section configured to specify a CSI-RS of the adjacent cell based on the CSI-RS parameters of the adjacent cell notified from the serving cell and perform CQI measurement by using the specified CSI-RS of the adjacent cell, and to specify a CSI-RS of the serving cell based on the CSI-RS parameters of the serving cell notified from the serving cell and perform CQI measurement by using the specified CSI-RS of the serving cell.

7. A reference signal transmission method comprising the steps of:
generating signals to specifically notify a mobile station apparatus of CSI-RS (Channel State Information-Reference Signal) parameters of a serving cell, including a signal sequence, a location position in a resource block and transmission power of the serving cell, and CSI-RS parameters of an adjacent cell, including a signal sequence, a location position in a resource block and transmission power of the adjacent cell; and
transmitting generated signals including the CSI-RS parameters of the serving cell and the CSI-RS parameters of the adjacent cell specifically to the mobile station apparatus via the serving cell on a downlink.

8. A reference signal reception method comprising the steps of:
receiving, from a serving cell, signals to notify a mobile station apparatus of CSI-RS (Channel State Information-Reference Signal) parameters of the serving cell, including a signal sequence, a location position in a resource block and transmission power of the serving cell, and CSI-RS parameters of an adjacent cell, including a signal sequence, a location position in a resource block and transmission power of the adjacent cell;
demodulating the signals received from the serving cell to acquire the CSI-RS parameters of the serving cell and the CSI-RS parameters of the adjacent cell, individually; and
specifying a CSI-RS of the adjacent cell based on the CSI-RS parameters of the adjacent cell notified from the serving cell and performing CQI measurement by using the specified CSI-RS of the adjacent cell, and specifying a CSI-RS of the serving cell based on the CSI-RS parameters of the serving cell notified from the serving cell and performing CQI measurement by using the specified CSI-RS of the serving cell.

* * * * *